(12) United States Patent
Bouzguarrou et al.

(10) Patent No.: US 10,990,404 B2
(45) Date of Patent: Apr. 27, 2021

(54) APPARATUS AND METHOD FOR PERFORMING BRANCH PREDICTION USING LOOP MINIMUM ITERATION PREDICTION

(71) Applicant: Arm Limited, Cambridge (GB)

(72) Inventors: Houdhaifa Bouzguarrou, Valbonne (FR); Luc Orion, Mouans Sartoux (FR); Guillaume Bolbenes, Antibes (FR); Eddy Lapeyre, Antibes (FR)

(73) Assignee: Arm Limited, Cambridge (GB)

( * ) Notice: Subject to any disclaimer, the term of this patent is extended or adjusted under 35 U.S.C. 154(b) by 236 days.

(21) Appl. No.: 16/100,344

(22) Filed: Aug. 10, 2018

(65) Prior Publication Data

US 2020/0050458 A1    Feb. 13, 2020

(51) Int. Cl.
*G06F 9/38*        (2018.01)
*G06F 9/30*        (2018.01)
*G06F 9/32*        (2018.01)

(52) U.S. Cl.
CPC ........ *G06F 9/3844* (2013.01); *G06F 9/30054* (2013.01); *G06F 9/30065* (2013.01); *G06F 9/325* (2013.01); *G06F 9/3848* (2013.01)

(58) Field of Classification Search
CPC .... G06F 9/325; G06F 9/30065; G06F 9/3844; G06F 9/3848

(Continued)

(56) References Cited

U.S. PATENT DOCUMENTS 5,740,419 A *   4/1998   Potter ..................... G06F 9/325
                                               712/241
5,909,573 A *   6/1999   Sheaffer ................. G06F 9/325
                                               712/240

(Continued)

OTHER PUBLICATIONS

Timothy Sherwood and Brad Calder. 2000. Loop Termination Prediction. In Proceedings of the Third International Symposium on High Performance Computing (ISHPC '00). Springer-Verlag, Berlin, Heidelberg, 73-87. (Year: 2000).*

(Continued)

*Primary Examiner* — Keith E Vicary
(74) *Attorney, Agent, or Firm* — Nixon & Vanderhye P.C.

(57) ABSTRACT

An apparatus and method are provided for performing branch prediction. The apparatus has processing circuitry to execute instructions, and branch prediction circuitry for making branch outcome predictions in respect of branch instructions. The branch prediction circuitry includes loop minimum iteration prediction circuitry having one or more entries, where each entry is associated with a loop controlling branch instruction that controls repeated execution of a loop comprising a number of instructions. During a training phase for an entry, the loop minimum iteration prediction circuitry seeks to identify a minimum number of iterations of the loop. The loop minimum iteration prediction circuitry is then arranged, when the training phase has successfully identified a minimum number of iterations, to subsequently identify a branch outcome prediction for the associated loop controlling branch instruction for use during the minimum number of iterations. It has been found that such an approach can significantly improve prediction accuracy for loop controlling branch instructions associated with loops that do not have a stable total number of iterations.

18 Claims, 12 Drawing Sheets

(58) Field of Classification Search
USPC .......................................................... 712/241
See application file for complete search history.

(56) References Cited

U.S. PATENT DOCUMENTS

| | | | | |
|---|---|---|---|---|
| 6,003,128 A * | 12/1999 | Tran | ...................... | G06F 9/3844 |
| | | | | 712/23 |
| 7,130,991 B1 * | 10/2006 | Butler | ..................... | G06F 9/325 |
| | | | | 712/241 |
| 10,275,249 B1 * | 4/2019 | Richins | ................. | G06F 9/3802 |
| 2002/0083310 A1 * | 6/2002 | Morris | ................... | G06F 9/325 |
| | | | | 712/233 |
| 2004/0123075 A1 * | 6/2004 | Almog | .................... | G06F 9/325 |
| | | | | 712/207 |
| 2004/0230782 A1 * | 11/2004 | Busaba | ................. | G06F 9/3844 |
| | | | | 712/241 |
| 2005/0138341 A1 * | 6/2005 | Maiyuran | ............. | G06F 9/3802 |
| | | | | 712/241 |
| 2005/0240896 A1 * | 10/2005 | Wu | ...................... | G06F 9/45525 |
| | | | | 717/100 |
| 2005/0283593 A1 * | 12/2005 | Vasekin | ................ | G06F 9/3848 |
| | | | | 712/240 |
| 2006/0080642 A1 * | 4/2006 | Ogawa | ................... | G06F 8/443 |
| | | | | 717/126 |
| 2007/0106848 A1 * | 5/2007 | Krishnaiyer | .......... | G06F 9/3455 |
| | | | | 711/137 |
| 2009/0055635 A1 * | 2/2009 | Tani | ...................... | G06F 9/3844 |
| | | | | 712/241 |
| 2014/0208085 A1 * | 7/2014 | Chung | .................. | G06F 9/3842 |
| | | | | 712/241 |
| 2015/0227374 A1 * | 8/2015 | Blasco | ................ | G06F 9/30189 |
| | | | | 712/240 |
| 2016/0259667 A1 * | 9/2016 | Bailey | ................... | G06F 9/4893 |
| 2017/0039072 A1 * | 2/2017 | Gellerich | ............ | G06F 9/30065 |

OTHER PUBLICATIONS

M. de Alba and D. Kaeli. Runtime predictability of loops. In IEEE International Workshop on Workload Characterization, pp. 91-98, Austin, TX, Dec. 2001. (Year: 2001).*

M. de Alba and D. Kaeli. Path-based hardware loop prediction. In the 4th International Conference on Control, Virtual Instrumentation and Digital Systems, Aug. 2002; 10 pages (Year: 2002).*

Youfeng Wu, M. Breternitz and T. Devor, "Continuous trip count profiling for loop optimization in two-phase dynamic binary translators," Eighth Workshop on Interaction between Compilers and Computer Architectures, 2004. INTERACT-8 2004., Madrid, Spain, 2004, pp. 3-12. (Year: 2004).*

Péricles R.O. Alves, Raphael E. Rodrigues, Rafael Martins de Sousa, and Fernando Magno Quintão Pereira. 2015. A case for a fast trip count predictor. Inf. Process. Lett. 115, 2 (Feb. 2015), 146-150. (Year: 2015).*

* cited by examiner

APPARATUS AND METHOD FOR PERFORMING BRANCH PREDICTION USING LOOP MINIMUM ITERATION PREDICTION

BACKGROUND

The present technique relates to an apparatus and method for performing branch prediction.

In order to seek to increase the performance of data processing systems, it is known to use branch prediction circuitry to seek to make predictions in respect of branch instructions. The predictions are then used by fetch circuitry to determine the instructions to be fetched from memory for execution by the processing circuitry of the data processing system. In particular, branch instructions can cause a change in flow of the instructions being executed, dependent on whether the branch is taken or not taken. If the system were merely to wait until the processing circuitry has executed the branch instruction (and hence it is known whether the branch is taken or not taken) before fetching the next instructions to be executed, this would have a significant impact on performance. Instead, branch prediction circuitry is used to seek to predict whether a branch will be taken or not taken, so that the fetch circuitry can continue to fetch instructions on the basis of that prediction. If the prediction later proves wrong, then the processing pipeline can be flushed, and processing can be resumed from the point of misprediction.

Branch prediction circuitry may consist of several components that are used when seeking to make branch outcome predictions in respect of branch instructions encountered within a sequence of instructions. One type of branch instruction is a loop controlling branch instruction that controls repeated execution of a loop. When such a loop is determined to have a stable total number of iterations, a loop termination predictor can be provided to make a branch outcome prediction for the associated loop controlling branch instruction, where the branch outcome prediction made is dependent on the particular iteration. However, such an approach cannot be used if the loop does not have a stable total number of iterations. For loops that do not have a stable total number of iterations, typically standard branch prediction schemes are used to seek to make predictions each time the loop controlling branch instruction is encountered. However, it would be desirable to increase the branch prediction accuracy for such loop controlling branch instructions.

SUMMARY

In one example configuration, there is provided an apparatus comprising: processing circuitry to execute instructions; and branch prediction circuitry to make branch outcome predictions in respect of branch instructions; the branch prediction circuitry including loop minimum iteration prediction circuitry having one or more entries, each entry being associated with a loop controlling branch instruction that controls repeated execution of a loop comprising a number of instructions, and being arranged during a training phase to seek to identify a minimum number of iterations of the loop; the loop minimum iteration prediction circuitry being arranged, when the training phase has successfully identified a minimum number of iterations, to subsequently identify a branch outcome prediction for the associated loop controlling branch instruction for use during each of the minimum number of iterations.

In another example configuration, there is provided a method of performing branch prediction in an apparatus having processing circuitry to execute instructions, and branch prediction circuitry to make branch outcome predictions in respect of branch instructions, the method comprising: providing within the branch prediction circuitry loop minimum iteration prediction circuitry having one or more entries, each entry being associated with a loop controlling branch instruction that controls repeated execution of a loop comprising a number of instructions; during a training phase for an entry, seeking to identify a minimum number of iterations of the associated loop; and when the training phase has successfully identified a minimum number of iterations, employing the loop minimum iteration prediction circuitry to subsequently identify a branch outcome prediction for the associated loop controlling branch instruction for use during each of the minimum number of iterations.

In a yet further example configuration, there is provided an apparatus comprising: processing means for executing instructions; and branch prediction means for making branch outcome predictions in respect of branch instructions; the branch prediction means including loop minimum iteration prediction means having one or more entries, each entry being associated with a loop controlling branch instruction that controls repeated execution of a loop comprising a number of instructions, and being arranged during a training phase to seek to identify a minimum number of iterations of the loop; the loop minimum iteration prediction means, when the training phase has successfully identified a minimum number of iterations, for subsequently identifying a branch outcome prediction for the associated loop controlling branch instruction for use during each of the minimum number of iterations.

BRIEF DESCRIPTION OF THE DRAWINGS

The present technique will be described further, by way of example only, with reference to examples thereof as illustrated in the accompanying drawings, in which.

DESCRIPTION OF EXAMPLES

Figure 1:
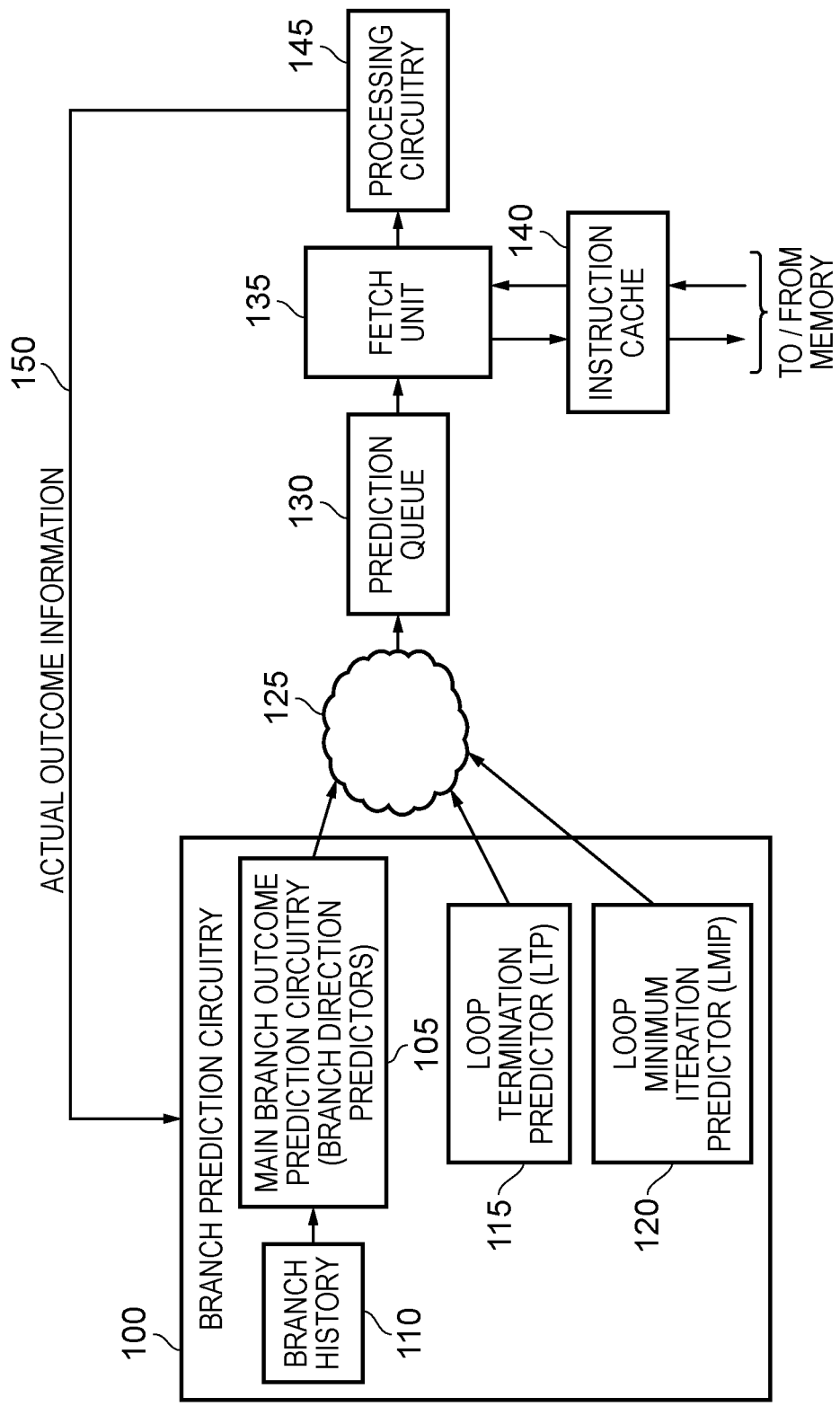
FIG. 1 is a block diagram illustrating an apparatus in accordance with one example.

In one example implementation, an apparatus is provided that has processing circuitry for executing instructions, and branch prediction circuitry to make branch outcome predictions in respect of branch instructions. The branch prediction circuitry includes loop minimum iteration prediction circuitry having one or more entries, each entry being associated with a loop controlling branch instruction that controls repeated execution of a loop comprising a number of instructions. However, in contrast to the earlier discussed loop termination predictor that can be used when a loop is found to have a stable number of iterations, the loop minimum iteration prediction circuitry can be used more frequently, and does not require a stable iteration count for the loop.

Instead, during a training phase for an entry, the loop minimum iteration prediction circuitry seeks to identify a minimum number of iterations of the loop. It will be appreciated that even in instances where the total iteration count may not be stable, it may be possible to identify a reliable minimum number of iterations of the loop.

Thereafter, the loop minimum iteration prediction circuitry is arranged, when the training phase has successfully identified a minimum number of iterations, to subsequently identify a branch outcome prediction for the associated loop controlling branch instruction for use during each of the minimum number of iterations.

Whilst this means that the loop minimum iteration prediction circuitry may not be able to produce a branch outcome prediction for every iteration, it is found that it can provide a highly accurate branch outcome prediction for a certain subset of the iterations, i.e. for a certain minimum number of iterations that will be expected each time the loop is executed. It has been found that the use of such a loop minimum iteration prediction circuitry can significantly improve branch prediction accuracy for loop controlling branch instructions that are associated with loops that do not have a stable total iteration count, and hence which cannot be predicted using a loop termination predictor.

In one implementation, the branch outcome prediction that is identified by the loop minimum iteration prediction circuitry indicates whether the associated loop controlling branch instruction is predicted as taken or predicted as not taken.

The loop controlling branch instructions that the loop minimum iteration prediction circuitry is arranged to maintain an entry for can be chosen dependent upon implementation. However, in one implementation, the loop minimum iteration prediction circuitry maintains an entry for a loop controlling branch instruction for which a total number of iterations of the associated loop is unstable. Then, for loop controlling branch instructions for which the total number of iterations of the associated loop is stable, a loop termination predictor can instead be used to maintain entries for those loop controlling branch instructions.

The entries within the loop minimum iteration prediction circuitry can be arranged in a variety of ways, but in one implementation each entry is arranged to maintain a minimum iteration count value and a confidence indication, the confidence indication being updated during the training phase to indicate a confidence in the minimum iteration count value based on observation of a total number of iterations of the loop each time the loop is executed during the training phase. Hence, over time, as the loop is executed multiple times, the confidence in the minimum iteration count value can be increased until a point is reached where the currently tracked minimum iteration count value is observed as being applicable to a predetermined number of previous instances of execution of the loop, at which point it can be decided that the training phase is complete and the loop minimum iteration prediction circuitry can then start making predictions using the information maintained in the entry.

In one example implementation, each entry has a total iteration count field, during the training phase the loop minimum iteration prediction circuitry being arranged to monitor a current execution of the loop, and to maintain in the total iteration count field an indication of the total number of iterations of the loop that occur during the current execution of the loop. On completion of the current execution of the loop, the loop minimum iteration prediction circuitry is then arranged, when the total number of iterations held in the total iteration count field is greater than or equal to the minimum iteration count value, to update the confidence indication to indicate an improved confidence in the minimum iteration count value. Hence, by tracking the total iteration count each time the loop is executed, and then comparing that against the currently maintained minimum iteration count value, it can be determined when the confidence indication can be adjusted to indicate an improved confidence in the minimum iteration count value. The confidence indication can take a variety of forms, but in one example may be a counter value that is incremented each time it is decided that the confidence has improved.

However, it may not always be the case that the confidence has improved. For example, if, on completion of the current execution of the loop, the total number of iterations held in the total iteration count field is determined to be less than the minimum iteration count value currently being maintained for the entry, the loop minimum iteration prediction circuitry may be arranged to update the minimum iteration count value to equal the total number of iterations for the current execution of the loop, and to reset the confidence indication to an initial value. Hence, at this point, there is a new, lower, value for the minimum iteration count, and the process of building up confidence in that new reduced minimum iteration count is restarted.

In one example implementation, when the confidence indication reaches a determined level, the loop minimum iteration prediction circuitry is then arranged to determine that the training phase is complete. For a subsequent execution of the loop, the loop minimum iteration prediction circuitry is then arranged to identify a branch outcome prediction for the associated loop controlling branch instruction for use during each of the minimum number of iterations identified by the currently maintained minimum iteration count value. Typically, once the identified minimum number of iterations have been encountered, the loop minimum iteration prediction circuitry will then stop making predictions for future iterations, and instead the predictions for the future iterations will be made using other components of the branch prediction circuitry, for example a standard branch direction predictor.

The branch prediction circuitry can include a variety of different branch prediction components that are used to influence the branch outcome predictions made by the branch prediction circuitry. In one example, the branch prediction circuitry may further include loop termination prediction circuitry having one or more entries, each entry being associated with a loop controlling branch instruction, and being arranged during a termination prediction training phase to seek to identify whether the associated loop has a stable total number of iterations. The loop termination prediction circuitry is then arranged, when the termination prediction training phase has successfully identified a stable total number of iterations, to subsequently identify a branch outcome prediction for the associated loop controlling branch instruction for use during each of the iterations of the associated loop. Hence, the loop minimum iteration prediction circuitry may be used in combination with loop termination prediction circuitry.

In one such example arrangement, the loop minimum iteration prediction circuitry is triggered to maintain an entry for a loop controlling branch instruction for which the loop termination prediction circuitry has been unable to identify a stable total number of iterations for the associated loop. Accordingly, in such an implementation, the loop controlling branch instruction is first allocated to the loop termination prediction circuitry, but if during the training phase within the loop termination prediction circuitry it is determined that a stable number of iterations is not identified, then an entry can instead be made within the loop minimum iteration prediction circuitry to seek to identify stability in a minimum iteration count.

Whilst the loop termination prediction circuitry and loop minimum iteration prediction circuitry can be kept as separate structures, in one example implementation the apparatus further comprises a common storage structure used to provide the entries for both the loop termination prediction circuitry and the loop minimum iteration prediction circuitry, each entry in the common storage having a type field which is set to identify whether the entry is associated with the loop termination prediction circuitry or the loop minimum iteration prediction circuitry. In particular, it has been found that much of the information that needs to be maintained in order to seek to identify a stable total number of iterations in the loop can also be reused when seeking to identify a stable number in the minimum number of iterations of the loop, and accordingly if it is decided that a stable total number of iterations cannot be determined, the entry can be switched so as to be considered an entry of the loop minimum iteration prediction circuitry, with the training phase of the loop minimum iteration prediction circuitry then being initiated.

Whilst the loop minimum iteration prediction circuitry can be arranged to operate in the earlier-described manner to seek to identify a stable minimum number of iterations of the loop, it is possible that over time the number of iterations of the loop may increase, and accordingly the minimum iteration count identified during the previous training phase may be unduly cautious. In order to address this issue, in one example implementation, subsequent to the training phase successfully identifying a minimum number of iterations of the loop, the loop minimum iteration prediction circuitry is responsive to a reset trigger to perform a reset operation for the identified minimum number of iterations.

This reset operation can cause the minimum number of iterations to be updated in a variety of ways. In one example implementation, following the reset trigger, the training phase is restarted in order to seek to re-determine a minimum number of iterations for the loop. Hence, in this example, the reset trigger effectively resets the entry and causes the training phase to restart.

However, in an alternative implementation, the apparatus may further comprise an ancillary counter storage to maintain an indication of the minimum number of iterations observed for the loop during a timing window prior to the reset trigger, and in response to the reset trigger, the minimum number of iterations identified in the entry for the loop controlling branch instruction may be updated to be a current value stored in the ancillary counter storage and the training phase may be restarted. Hence, the ancillary counter storage can be used for example to maintain a minimum number of iterations observed during some later timing window after the original training took place. When the reset trigger is then encountered, that more current minimum iteration count can be used to update the minimum iteration count maintained in the entry. The training phase can then be restarted from that point to ensure that a certain level of confidence is observed in that new minimum iteration value.

In another example implementation, the ancillary counter storage is again used to maintain an indication of the minimum number of iterations observed for the loop, but in this case this is done during an ancillary training phase prior to the reset trigger. In response to the reset trigger, the minimum number of iterations identified in the entry for the loop controlling branch instruction may then be updated to be a current value stored in the ancillary counter storage. However, at this point it may not be necessary to completely restart the training phase. For example, an ancillary confidence may be kept in association with the ancillary counter, and the current status of that ancillary confidence can be copied over to the main confidence indication held in association with the minimum iteration count in the entry, at which point any remaining part of the training phase can be performed until the confidence reaches the required level.

Alternatively, the reset trigger itself will only occur once the ancillary training phase has successfully identified a minimum number of iterations, and accordingly by the time the contents of the ancillary counter storage are copied to the minimum number of iterations field of the entry, the training has been successful, and the loop minimum iteration prediction circuitry can immediately begin to make predictions based on that new minimum value.

The reset trigger used to perform a reset operation for the identified minimum number of iterations can take a variety of forms. For example, the reset trigger may be arranged to occur at least one of:

periodically;

randomly;

in response to an indication that an average total number of iterations has increased by a certain threshold amount since the training phase was completed; and/or following completion of an ancillary training phase to seek to produce a further indication of a minimum number of iterations.

Particular examples will now be described with reference to the Figures.

FIG. 1 is a block diagram of a data processing apparatus in accordance with one example implementation. The apparatus includes processing circuitry 145 for executing a sequence of instructions that have been fetched by a fetch unit 135. The fetch unit has access to one or more levels of cache, for example the instruction cache 140 and any lower levels of cache within a cache hierarchy, and initially seeks to fetch instructions from the instruction cache 140. In the event of a cache miss, the requests are propagated to a lower level of the cache hierarchy and/or main memory, in order to retrieve into the fetch unit the instructions that need executing.

Exactly which instructions are fetched by the fetch unit is dictated by the output of a prediction queue 130 which includes storage to maintain a series of prediction results produced by branch prediction circuitry 100, with those prediction results then being analysed to determine a sequence of instructions to be fetched for execution by the processing circuitry. As will be understood by those skilled in the art, when stepping through a sequence of instructions at sequential memory addresses, when a branch instruction is encountered, this can cause a change in instruction flow, dependent on whether the branch instruction is taken or not taken. If the branch is not taken, then the next instruction to be executed will typically be the instruction immediately following the branch instruction (i.e. the one at the next incremented memory address), but if the branch is taken then instruction flow will branch to a target address that is determined for that branch instruction, such that the next instruction to be executed will be an instruction at that target address. Often, branch instructions can be conditional, and hence for any particular conditional branch instruction it will not always be the case that the branch is taken or not taken. Branch prediction circuitry 100 can be used to seek to make predictions as to whether a branch will be taken or not taken, and may include a variety of different types of branch prediction components for use in making such predictions. Often, one or more of those components will operate based on knowledge of the previous history of actual execution by the processing circuitry, with that information being forwarded over path 150 back to the branch prediction circuitry 100.

Often the branch prediction circuitry can be arranged to review blocks of instructions at a time, and each block may for example be referred to as a predict block herein. The predict block will in one implementation include a number of consecutive instructions in the memory address space, for example 8 consecutive instructions. The branch prediction circuitry will seek to analyse the block of instructions in order to predict whether one or more of those instructions are branch instructions, and in the event that they are branch instructions, may seek to provide a prediction as to whether the branch is taken or not taken. This results in the generation of a prediction result for each predict block, which can be routed via combinatorial logic 125 to produce prediction results that are fed into the prediction queue 130. The prediction queue can then analyse these prediction results in order to determine which instructions should be fetched by the fetch unit for execution by the processing circuitry. In the event that the predictions made by the prediction circuitry are accurate, this can significantly improve performance, since the appropriate instructions can be fetched from the instruction cache 140/lower levels of the memory hierarchy in advance of them being required by the processing circuitry, avoiding the need to await the actual outcome of the branch instruction before fetching the next instructions. In the event that a branch prediction proves to be incorrect, then the state of the processing circuitry can be restored to the point prior to the misprediction taking place, and processing can then resume from that point.

In addition to predicting whether a branch will be taken or not taken, which can be referred to as branch direction prediction, the branch prediction circuitry may also perform other forms of branch prediction, for example seeking to predict the target address of a branch that is predicted as taken. However, for the purposes of the following discussion, the discussion of the activities of the branch prediction circuitry will concentrate on the branch direction prediction made by the branch prediction circuitry.

The branch prediction circuitry 100 may include main branch outcome prediction circuitry 105 that can comprise one or more branch direction predictors for seeking to predict a branch outcome of a branch instruction, and in particular whether that branch is predicted as taken or not taken. The predictions made will typically be influenced by the branch history 110 maintained to take into account the actual outcome information obtained from the processing circuitry 145 when branch instructions are executed, and hence taking into account the true taken/not taken behaviour of the branch instructions.

Figure 2A:
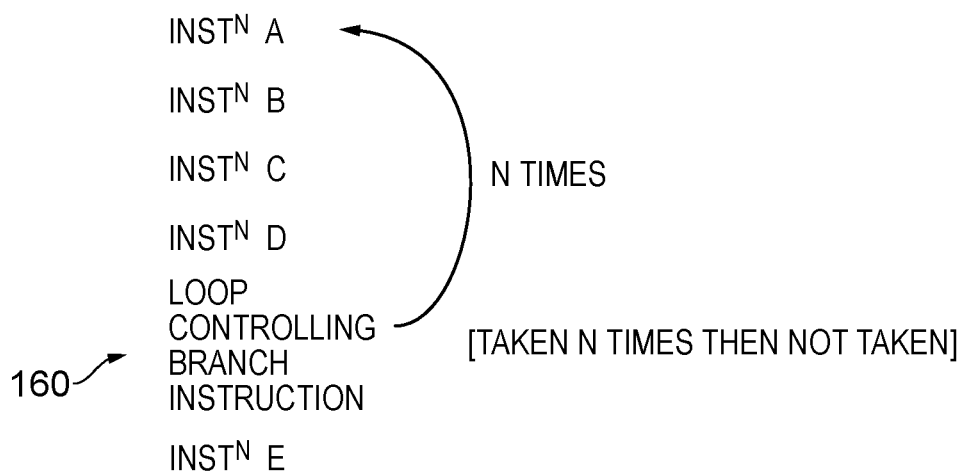
FIGS. 2A and 2B illustrate two different forms of loop controlling branch instruction that may be employed.
Figure 2B:
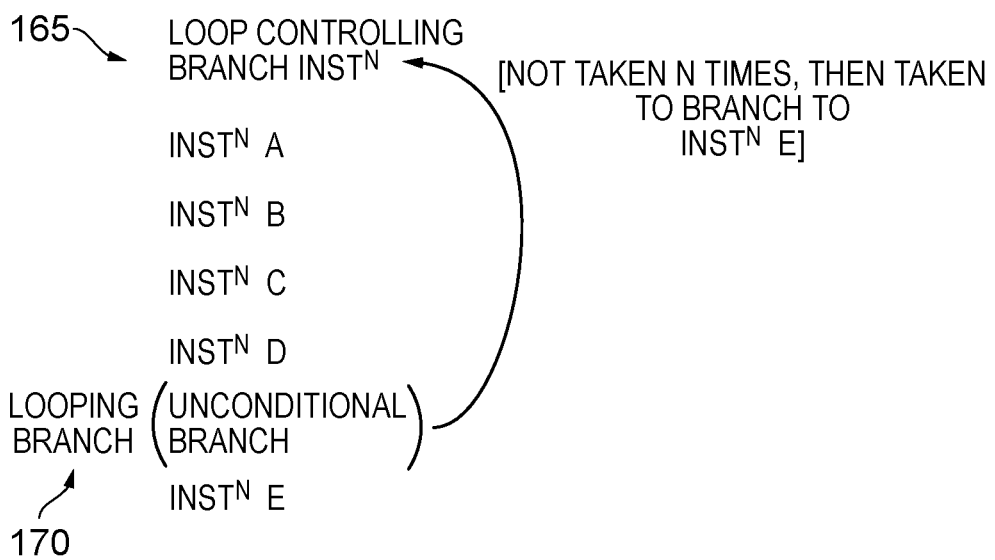

In addition to the main branch outcome prediction circuitry 105, the branch prediction circuitry 100 of FIG. 1 has a loop termination predictor 115 that is used to maintain branch outcome prediction information for one or more loop controlling branch instructions. Each loop controlling branch instruction is a branch instruction that is used to control repeated execution of a loop that comprises a number of instructions. Two examples forms of loop controlling branch instruction are shown in FIGS. 2A and 2B. FIG. 2A illustrates a sequence of instructions at consecutive memory addresses, where a loop controlling branch instruction 160 exists between instruction D and instruction E. When the loop controlling branch instruction is taken, the target address for the loop controlling branch instruction is the address of instruction A, and hence the loop controlling branch instruction identifies that instructions A to D form a loop. Due to the nature of the loop controlling branch instruction 160 it is expected that the loop controlling branch instruction will be taken a significant number of times, and then on the final iteration of the loop will not be taken, such that the next instruction to be executed thereafter will be instruction E. Once the loop has been initiated, the loop controlling branch instruction will be encountered frequently, and a prediction will be made each time for that loop controlling branch instruction. Each time a prediction is made, then the branch history 110 can be updated. This can cause a number of issues for a standard branch direction predictor. Firstly, the branch history will typically be of a finite size, and will quite quickly become heavily influenced by the predictions made in respect of the multiple instances of the loop controlling branch instruction. This can adversely affect the prediction accuracy that can be made with regard to other branch instructions. Further, on the final iteration of the loop controlling branch instruction, the prediction will be wrong, since by that stage it is expected that the normal branch prediction circuitry will predict the loop controlling branch instruction as strongly taken, and accordingly will also predict the loop controlling branch instruction as taken when the final iteration is reached. The loop termination predictor 115 is provided to alleviate the above problems.

In particular, when a misprediction is made using the standard branch prediction circuitry 105 for a branch instruction that has been strongly predicted correctly beforehand, then an entry can be made within the loop termination predictor 115 since it is likely that such a branch instruction will be a loop controlling branch instruction. The loop termination predictor is then arranged to monitor the behaviour of that loop controlling branch instruction for a number of future occurrences of the loop, in order to seek to determine whether a stable number of iterations is observed for the loop. Once there is a certain level of confidence in the stability of the iteration count, then the loop termination predictor can be used to make future predictions each time the loop controlling branch instruction is encountered. In particular, considering the example of FIG. 2A, once for the loop controlling branch instruction 160 there is a threshold level of confidence that the iteration count of the associated loop is stable, then the entry associated with the loop controlling branch instruction 160 within the loop termination predictor can be viewed as an active entry, and thereafter predictions can be made for that loop controlling branch instruction each time the loop is executed. In accordance with the scheme in FIG. 2A, for the first N iterations, the loop termination predictor 115 will predict that the loop controlling branch instruction is taken each time it is encountered, but on a final iteration will predict that the loop controlling branch instruction is not taken.

As shown in FIG. 2B, another form of loop controlling branch instruction is the form 165 which can be provided at the beginning of a loop. In such instances there will typically be an unconditional branch, referred to herein as the looping branch instruction 170, which branches back to the loop controlling branch instruction 165, and hence defines the loop. It can be seen from a comparison of FIGS. 2A and 2B that in both instances the loop is effectively the same, and involves executing instructions A to D during each iteration of the loop. When using the form of loop controlling branch instruction in FIG. 2B, the branch outcome pattern for the loop controlling branch instruction will be different to that for the loop controlling branch instruction 160 of FIG. 2A, in that the loop controlling branch instruction 165 will be not taken N times, and then will be taken on a final iteration.

Figure 3:
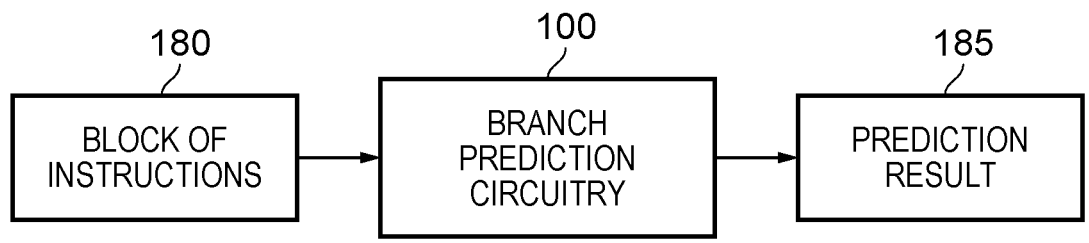
FIG. 3 illustrates how branch prediction circuitry can analyse a block of instructions in order to produce a prediction result.

FIG. 3 illustrates how the branch prediction circuitry 100 can be arranged to consider a block of instructions 180 and produce a prediction result for that block. The block of instructions will typically comprise a plurality of sequentially addressed instructions, and in one particular example is formed of 8 instructions. Starting with the instruction at the first memory address, the branch prediction circuitry seeks to predict whether any of the instructions in the block is a branch instruction, and if so seeks to predict the outcome of that branch instruction. Once a branch instruction is encountered that is predicted as taken, then no further analysis of any subsequent instructions in the block is necessary. The branch prediction circuitry 100 will then produce a prediction result 185 that identifies the instructions within the block that should be executed. In particular, it will identify one or more instructions that are to be executed, starting with the instruction at the first memory address. As soon as a branch instruction is encountered that is predicted as taken, then that forms the last instruction in the sequence to be executed, and is identified as such within the prediction result. The next block of instructions to be analysed by the branch prediction circuitry will in that instance be a sequence of instructions starting with the target address of the branch instruction that was predicted as taken.

From the above discussion, it will be appreciated that where loop controlling branch instructions can be identified, and the associated loop has a stable number of iterations, a more accurate prediction in respect of those loop controlling branch instructions can be made by the loop termination predictor 115, and its output can be used in preference to any prediction made by the main branch outcome prediction circuitry 105 for that branch instruction.

As shown in FIG. 1, in addition to the loop termination predictor (LTP) 115, the branch prediction circuitry 100 includes a loop minimum iteration predictor (LMIP) 120. As discussed earlier, the LTP 115 is used to seek to detect, for a loop controlling branch instruction, whether the associated loop has a stable number of total iterations each time that loop is executed. In the presence of their being a stable total number of iterations, the LTP 115 can be used to provide subsequent predictions each time the loop controlling branch instruction is encountered during subsequent executions of the loop.

However, it can often be the case that it will not be possible to detect a stable number of total iterations for the loop, and in instances where the total number of iterations varies it is then not possible to complete the training phase in the LTP 115 in order to create an active entry that can be used for subsequent prediction. Instead, it has traditionally been the case that the main branch outcome prediction circuitry 105 will then be used to seek to make predictions for loop controlling branch instructions in such situations.

However, in accordance with the techniques described herein it may be possible in instances where a loop does not have a stable total number of iterations to still be able to determine, using the LMIP 120, a stable minimum number of iterations that arise each time the loop is executed. In such instances, an entry can be populated within the LMIP 120 and when the training phase is passed (i.e. when it has been determined that there is a reasonable confidence in a stable minimum iteration count), then the LMIP 120 can be used during subsequent executions of the loop to make branch outcome predictions for the associated loop controlling branch instruction during that minimum number of iterations that is identified in the LMIP 120. Thereafter, predictions made in respect of the additional iterations encountered in any particular execution of the loop can be made using the main branch outcome prediction circuitry 105. It has been found that by providing the LMIP 120, this can improve the prediction accuracy of the branch prediction circuitry 100 when making branch predictions for loop controlling branch instructions that are associated with loops that do not have a stable total iteration count.

Figure 4:
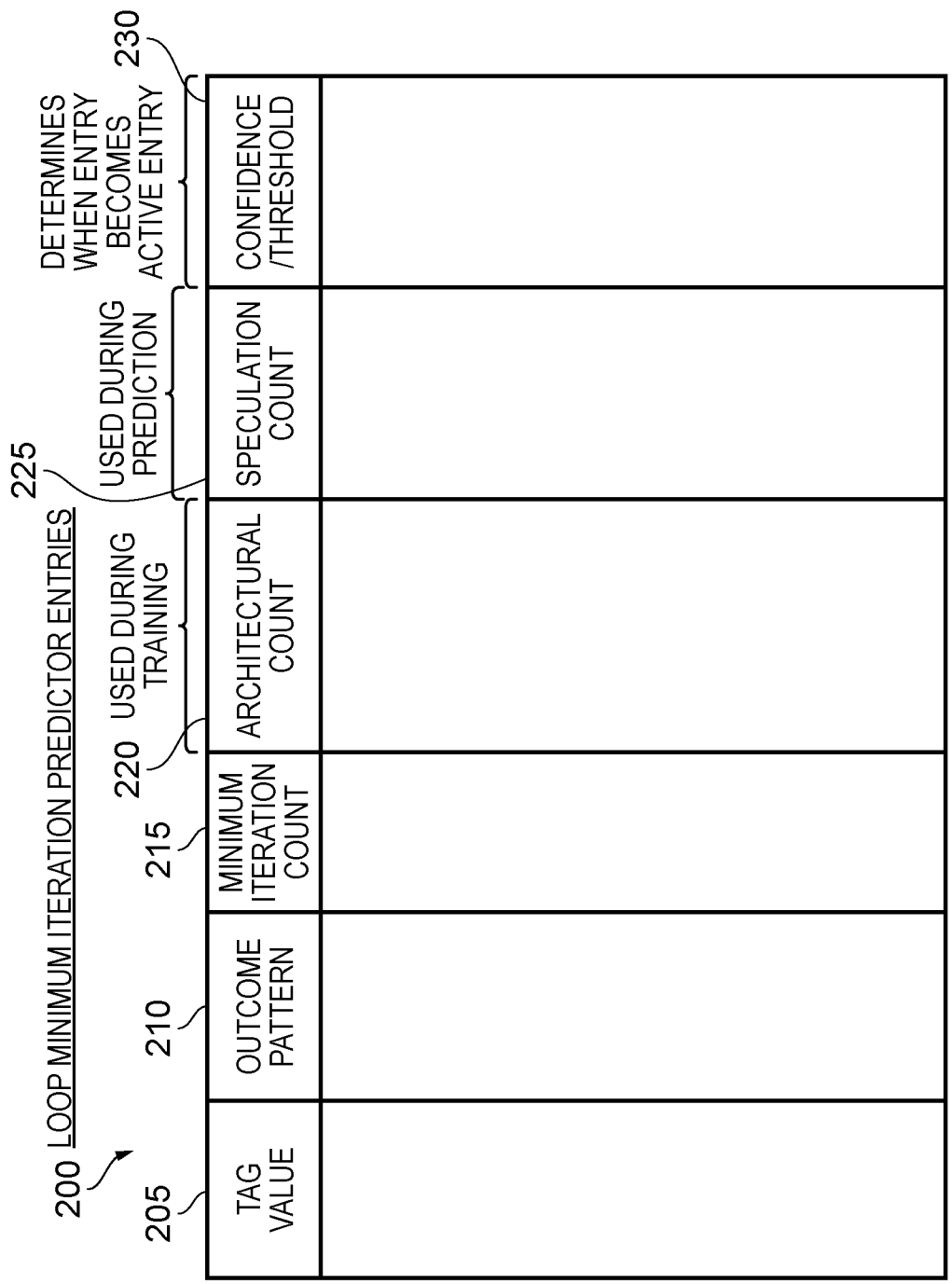
FIG. 4 illustrates the content of entries within the storage of the loop minimum iteration predictor of FIG. 1 in accordance with one example.

FIG. 4 is a block diagram illustrating various fields that can be provided within the predictor storage 200 of the loop minimum iteration predictor 120 in accordance with one example arrangement. A tag value field 205 is used to identify the loop controlling branch instruction that is associated with that entry, typically by storing a certain portion of the memory address of that instruction. The outcome pattern 210 is used to identify whether the associated loop controlling branch instruction is to be predicted as taken for all iterations except the final iteration, or to be predicted as not taken for all iterations except the final iteration. The minimum iteration count field 215 is used to identify a minimum number of iterations of the loop that occur between the loop being initiated and the loop being terminated, and during a training phase the loop minimum iteration predictor 120 is arranged to seek to determine whether that minimum iteration count is stable, when considering multiple occurrences of the loop.

The architectural count field 220 is used to keep track of the total number of iterations of the loop that have been executed and committed by the processing circuitry 145. Hence, during a first occurrence of the loop during the training phase, the architectural count field 220 will be used to keep track of the total number of iterations that have been executed, and then when the loop terminates, that value is written into the minimum iteration count field 215. The next time the loop is encountered, the architectural count field is again used to keep track of the total number of iterations that have been executed. Then, when the loop terminates, it is determined whether the count in the architectural count field is greater than or equal to the minimum iteration count in the field 215. If so, then a confidence value in the confidence field 230 can be increased. This process can then be repeated for subsequent instances of the loop.

In one implementation, if at any point when a loop has finished being processed by the processing circuitry, it is determined that the current architectural count 220 is less than the currently recorded minimum iteration count 215, then the confidence is reset, and then the architectural count value is written into the minimum iteration count value 215. If the confidence value reaches a certain threshold, indicative of a level of confidence being reached in the stability of the minimum iteration count, then the entry can begin to be used by the loop minimum iteration predictor to make future predictions.

In one implementation, the threshold can be increased each time the confidence is reset, so as to increase the number of times a stable minimum iteration count needs to be observed before the confidence is considered high enough to start making predictions.

Once the threshold has been reached, then on a subsequent occurrence of the loop, the loop minimum iteration predictor can make a prediction as to the outcome of the loop controlling branch instruction for each of those minimum number of iterations. Each time such a prediction is made, then the speculation count 225 is incremented, so as to keep track of the total number of predictions that have been made using the LMIP 120. This information can be used when determining how to reset the state of the processing circuitry in the event that a branch misprediction is made by the branch prediction circuitry 100 at some point. In particular, at certain checkpoints during execution of the code, the current value of the speculation count can be saved, so that if it subsequently becomes necessary to restore the state of the processing circuitry to that checkpoint, then the speculation count value 225 can be overwritten with the saved speculation count from that checkpoint.

In one specific implementation, assuming an in-order processor is used, then during the active phase (i.e. when predictions are being made) the architectural count field 220 can still be used, to keep track of iterations whose execution has been committed by the processing circuitry. This can provide a more efficient mechanism for checkpointing the speculation count for in-order processors. In particular, in the event of a misprediction, it may be sufficient to merely overwrite the speculation count value 225 with the current contents of the architectural count field 220. Purely by way of specific example, if the speculation count is currently 5 and the architectural count is currently 2 at the point where a misprediction is made, then the speculation count can be updated to 2, and when the processing circuitry resumes execution, predictions can continue to be made for the loop controlling branch instruction for the third and subsequent iterations.

Figure 5:
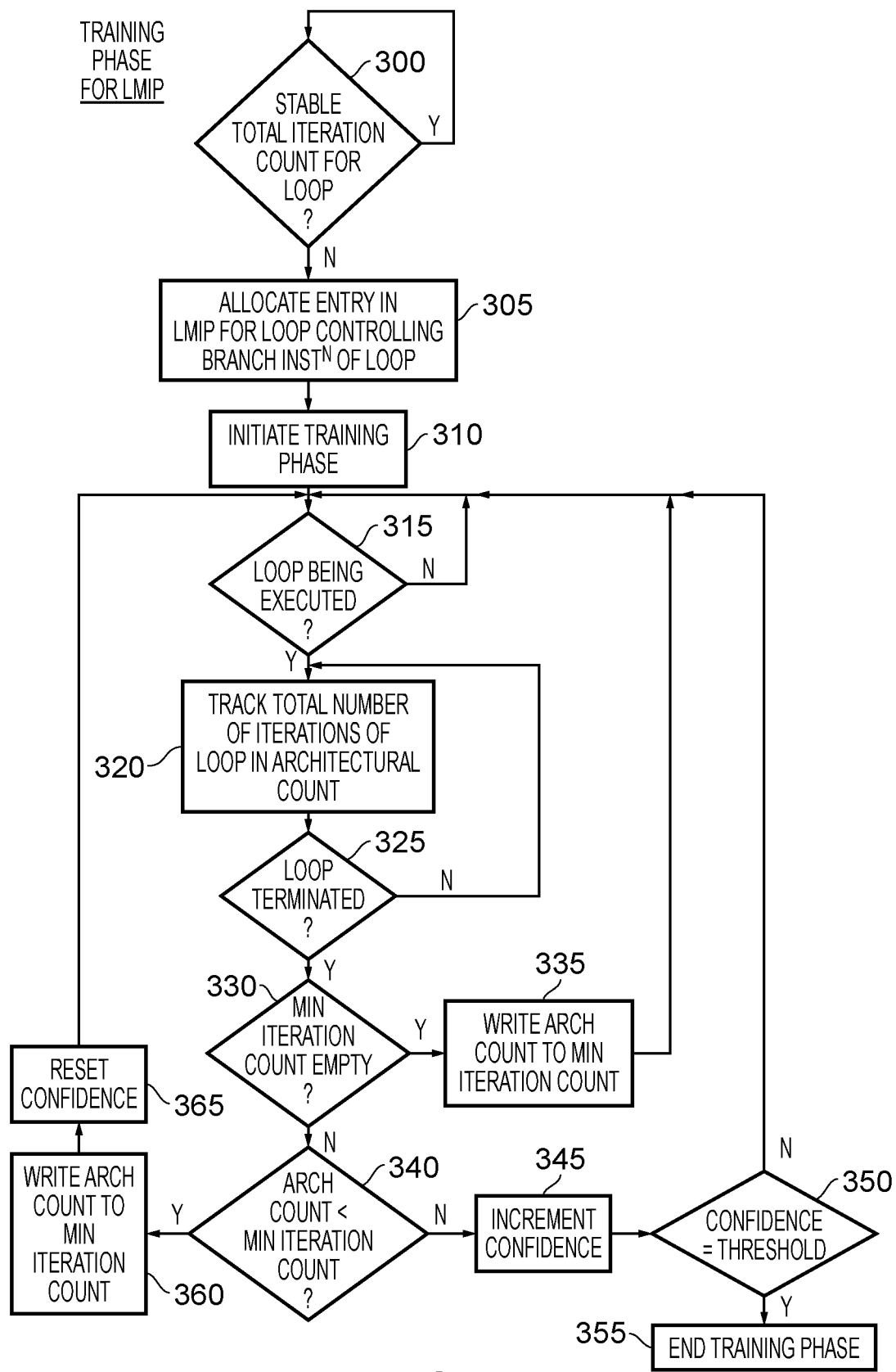
FIG. 5 is a flow diagram illustrating steps performed during a training phase for the loop minimum iteration predictor, in accordance with one example arrangement.

FIG. 5 is a flow diagram illustrating the steps performed during the training phase of an entry within the LMIP 120. In particular, in one example implementation, it is determined at step 300 whether a stable total iteration count has been determined for the loop. This is dependent on the activities of the LTP 115 when monitoring multiple instances of execution of the loop associated with a particular loop controlling branch instruction. If a stable total iteration count is found, then as discussed earlier an active entry may be maintained in the LTP 115, and there is no need to make any corresponding entry in the LMIP 120. However, if the training phase of the LTP 115 fails, and accordingly at step 300 a stable total iteration count is not found, then at step 305 an entry can be allocated in the LMIP 120 for the loop controlling branch instruction of the relevant loop. Thereafter, at step 310 a training phase can be initiated within the LMIP 120.

At step 315, it is determined whether the loop is being executed. Once execution of the loop is initiated, the process proceeds to step 320, where the total number of iterations of the loop are tracked, by populating the architectural count within the architectural count field 220. In particular, as each iteration is committed by the processing circuitry, the architectural count is incremented. At step 325 it is determined whether the loop has been terminated, and whilst that is not the case step 320 continues to be performed.

However, once it is determined that the loop has terminated, the process then proceeds to step 330 where it is determined whether the minimum iteration count field 215 is empty. This will be the case on the first occurrence of execution of the loop following allocation of an entry in the LMIP 120, since at the time the entry is originally allocated the minimum iteration count field 215 will be left blank, or a predetermined value will be stored therein that is interpreted as the entry being blank, for example an all zeroes value.

If the minimum iteration count field is empty, then the process proceeds to step 335 where the architectural count from the architectural count field 220 is written into the minimum iteration count field 215, whereafter the process returns to step 315 to await the next occurrence of execution of the loop.

If at step 330 it is determined that the minimum iteration count is not empty, which will be the case for every occurrence of the loop other than the first occurrence, then at step 340 it is determined whether the architectural count is less than the minimum iteration count. If the minimum iteration count is truly tracking a minimum, then this should not be the case, and it will be expected that the architectural count will be equal to, or greater than, the currently tracked minimum iteration count. Hence, if the architectural count is not less than the minimum iteration count, the process proceeds to step 345 where the confidence indication is incremented in order to indicate an increased confidence that the minimum iteration count value is accurate.

At step 350, it is then determined whether the confidence indication has reached a threshold value, and if not the process returns to step 315 to await execution of another instance of the loop. However, if the confidence indication has reached the threshold, then the process proceeds to step 355 where it is determined that the training phase has ended. Thereafter, the entry becomes an active entry which can be used for making subsequent predictions.

If at step 340 the architectural count is determined to be less than the minimum iteration count, then at step 360 the architectural count is written into the minimum iteration count field 215, and at step 365 the confidence indication is reset. In particular, at this point it is considered that there is no confidence in the minimum iteration count value. Thereafter, the process returns to step 315.

Figure 6:
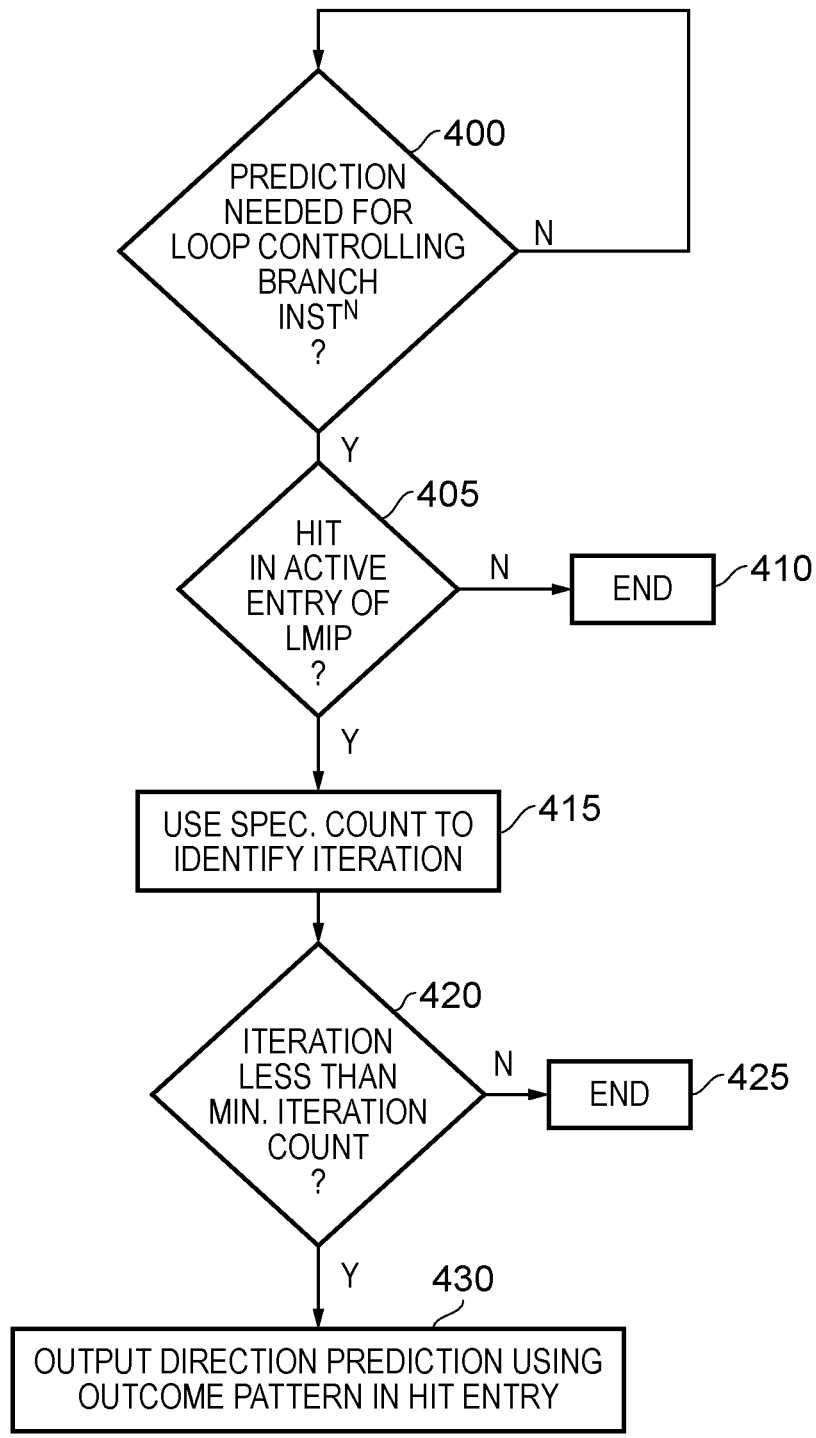
FIG. 6 is a flow diagram illustrating how the loop minimum iteration predictor may be used during an active phase to make predictions as to the direction to be taken by a loop controlling branch instruction, in accordance with one example.

FIG. 6 is a flow diagram illustrating the prediction (also referred to as active) phase of an LMIP 120 entry. At step 400, it is determined whether a prediction is needed for a loop controlling branch instruction, and if so at step 405 it is determined whether there is a hit in an active entry of the LMIP 120 for the branch instruction for which a prediction is needed. This can be determined by comparing the tag value in the tag field 205 with the corresponding tag value of the instruction that needs a prediction. If there is no hit, then the process ends at step 410, and no prediction will be output from the LMIP 120.

However, assuming a hit is detected within an active entry of the LMIP 120 (as mentioned earlier an active entry being an entry for which the training phase has been passed), then the speculation count field 225 is used to identify the current iteration. In particular, the speculation count can be incremented each time a prediction is made for the loop controlling branch instruction during execution of the loop, and accordingly that information can be used to identify the current iteration that is now to be predicted. At step 420 it is determined whether the current iteration is less than the minimum iteration count, and if not the process ends at step 425. In particular, the LMIP 120 is only used to make predictions for the first sequence of iterations up to the minimum iteration count, and thereafter other prediction components, such as the main branch outcome prediction circuitry 105, are used to make subsequent predictions in respect of the loop controlling branch instruction whilst the loop continues to be executed.

However, if the iteration identified at step 415 is less than the minimum iteration count, then at step 430 the LMIP 120 is used to output a direction prediction using the outcome pattern in the hit entry. Hence, if the outcome pattern indicates that the loop controlling branch instruction will be taken on all iterations other than the final iteration, the direction prediction will be that the branch is taken. Conversely, if the outcome pattern indicates that the loop controlling the branch instruction will be not taken for all iterations other than the last iteration, then the direction prediction made at step 430 will identify that the branch instruction is not taken. In the example discussed with reference to FIG. 1, a prediction made by the LMIP 120 will take precedence over a prediction made by the main branch outcome prediction circuitry 105. Similarly, a prediction from the LTP 115 is given precedence over a prediction from the main branch outcome prediction circuitry 105 and from the LMIP 120. When adopting the earlier-discussed technique for allocating into the LMIP 120, it is expected that there will not typically be a hit in both the LTP 115 and the LMIP 120 for any particular loop controlling branch instruction. However, in some implementations this may be possible in certain instances. For example, if a loop controlling branch instruction were allocated an entry in the LMIP 120 (due to there not being a stable total iteration count for the associated loop), but then in due course the total iteration count did become stable an entry may at that time be allocated in the LTP 115. If a threshold level of confidence were then reached in the total iteration count, the LTP 115 may then begin making predictions, and if at that point a valid entry still exists in the LMIP 120, the LTP 115 prediction can be given priority over the LMIP 120 prediction.

Figure 7:
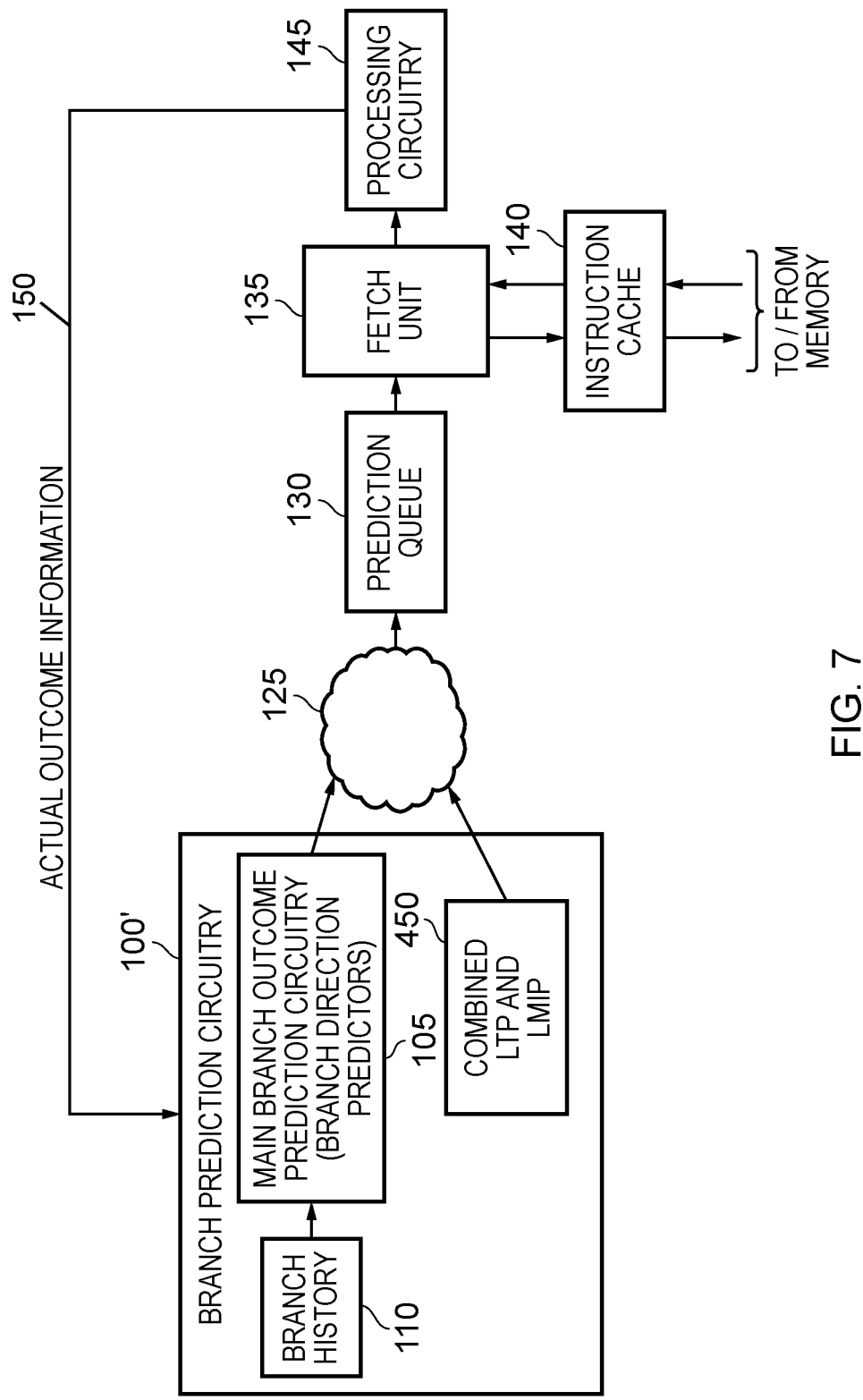
FIG. 7 is a block diagram illustrating an apparatus in accordance with an alternative implementation where the loop termination predictor and loop minimum iteration predictor are combined.

FIG. 7 is a block diagram illustrating an apparatus similar to FIG. 1, but where the LMIP 120 functionality is incorporated within the LTP 115. Accordingly, instead of the separate LTP 115 and LMIP 120 in FIG. 1, a combined LTP and LMIP 450 is provided. In particular, it has been found that it is possible to implement the LMIP 120 directly into the LTP 115 with minimum storage overhead.

Figure 8:
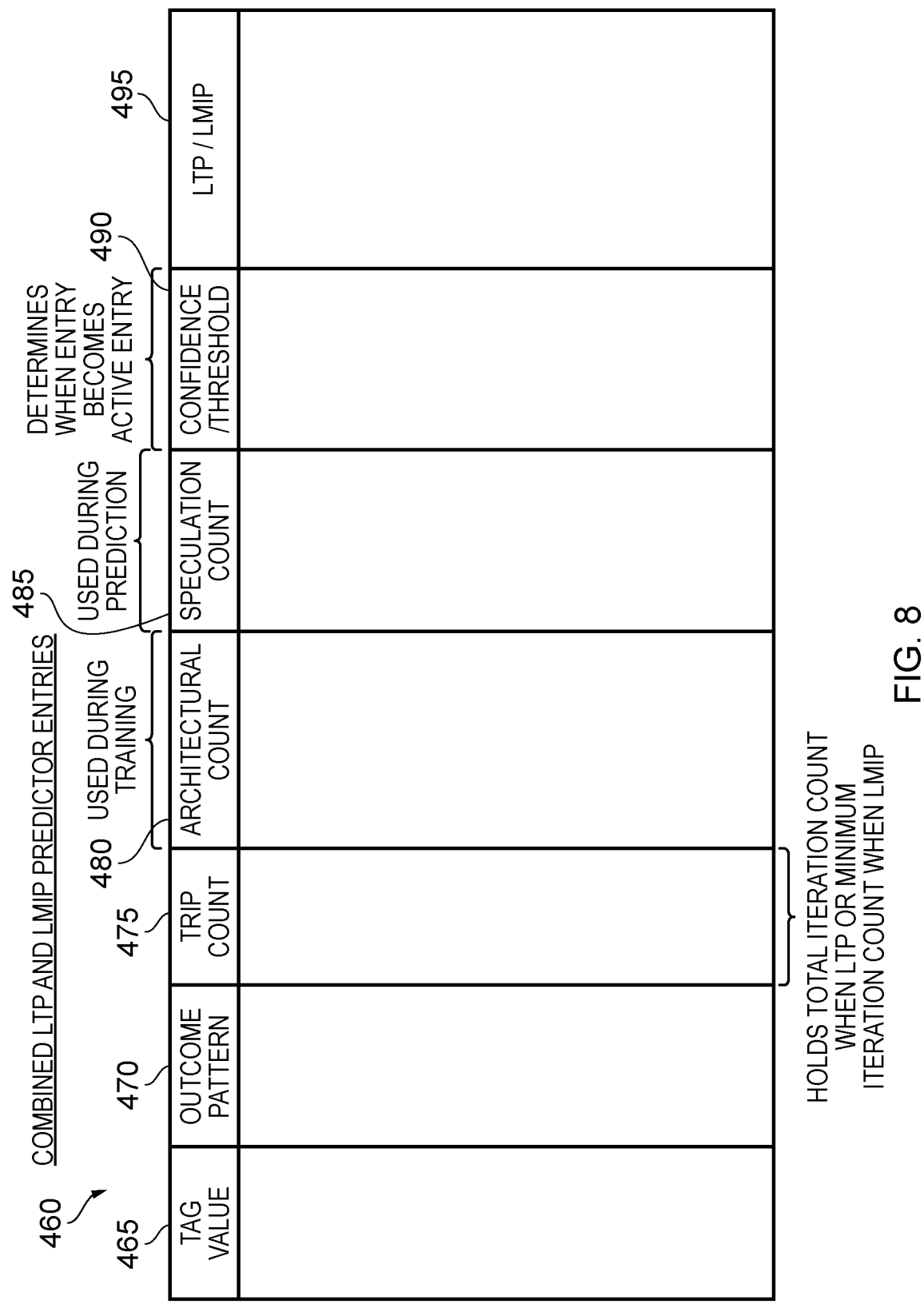
FIG. 8 illustrates the contents of entries within the storage of the combined loop termination predictor and loop minimum iteration predictor of FIG. 7 in accordance with one example.

The storage entries within the combined LTP and LMIP 450 can take the form shown in FIG. 8 in one example implementation. From a comparison of FIG. 8 with the earlier described FIG. 4, it will be seen that each of the entries in the storage 460 contains many of the same fields as provided within the entries of the storage 200 of FIG. 4. In particular, the tag value field 465, outcome pattern field 470, architectural count field 480, speculation count field 485 and confidence/threshold field 490 correspond directly to the corresponding fields 205, 210, 220, 225 and 230 discussed earlier with reference to FIG. 4. Instead of the minimum iteration count field 215 of FIG. 4, in the example of FIG. 8 there is a trip count field 475, with the count value held therein being dependent upon whether the entry is being used as an LTP 115 entry or an LMIP 120 entry. Which type of entry any particular entry corresponds to is indicated by the LTP/LMIP field 495, which in one implementation may merely be a single bit field where a first value indicates that the entry is an LTP 115 entry and the other value indicates that the entry is an LMIP 120 entry. When an entry is an LTP 115 entry, then the trip count field 475 holds the total iteration count. However, when the entry is an LMIP 120 entry, the trip count field 475 holds the minimum iteration count.

Figure 9:
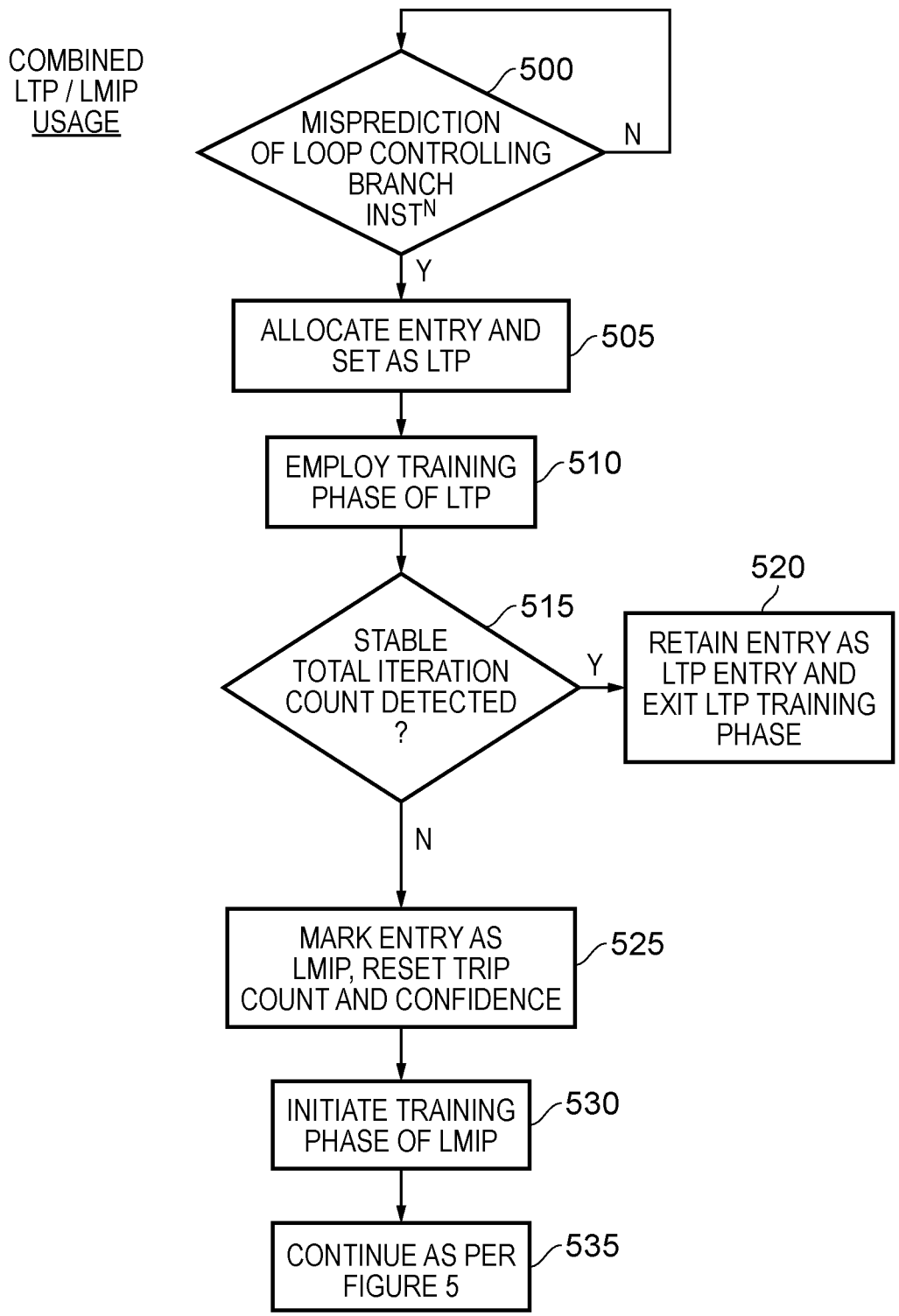
FIG. 9 is a flow diagram illustrating how the combined loop termination predictor and loop minimum iteration predictor may be used in one example implementation.

FIG. 9 is a flow diagram illustrating usage of the combined LTP/LMIP 450. At step 500, it is determined if there is a misprediction for a loop controlling branch instruction. This may for example arise when initially a loop controlling branch instruction is being predicted by the main branch outcome prediction circuitry 105. In particular, as each iteration takes place, and the same branch outcome is observed, then the main branch outcome prediction circuitry will start to reliably predict the branch direction for the loop controlling branch instruction. However, since it operates based on branch history, it will mispredict the final iteration, where the branch outcome behaviour of the loop controlling branch instruction changes.

At that point, an entry can be allocated into the combined LTP and LMIP 450 at step 505, and the field 495 will be set to identify that the entry is an LTP 115 entry.

Thereafter, the training phase of the LTP 115 is performed in respect of the entry at step 510, after which it is determined at step 515 whether a stable total iteration count has been detected. If so, then the entry can be retained as an LTP 115 entry and the LTP 115 training phase can be exited, as indicated by step 520. Thereafter the LTP 115 becomes an active entry that can be used for prediction. Active entries can be distinguished from non-active entries (i.e. entries that are still in the training phase) by looking at the confidence indication in the confidence indication field 490, and in particular detecting whether it is yet at the threshold level.

If a stable total iteration count is not detected, then the process can proceed to step 525 where the entry is retained but the field 495 is updated to identify that that entry is now an LMIP 120 entry. At this point, the trip count field 475 will be reset as will the confidence indication field 490. Thereafter, at step 530 the training phase is initiated in respect of the LMIP 120 entry, whereafter the process continues as per the remainder of FIG. 5 (i.e. as from step 310 of FIG. 5), as indicated by the box 535 in FIG. 9.

In some implementations, it is desirable to allow the minimum iteration count to be reset dynamically so as to allow it to follow program behaviour. In particular, whilst a stable minimum iteration count may be detected at a certain point in time, it is possible that at later points in time the loop behaviour changes, and in particular each time the loop is executed it may employ a larger number of iterations. In such a scenario, the minimum iteration count value will be unduly cautious, and will not allow the maximum benefits of the prediction accuracy of the LMIP 120 to be achieved, since the LMIP 120 will only be used to output predictions for the minimum number of iterations identified in its records. Hence, as will be discussed with reference to the remaining figures, the loop minimum iteration prediction circuitry may be responsive to a reset trigger to perform a reset operation for the identified minimum number of iterations. Such a technique can be employed irrespective of whether a separate LMIP 120 is provided, as per FIG. 1, or whether a combined LTP and LMIP 450 is used as per the example of FIG. 7. However, for the subsequent example discussion, a separate LMIP 120 structure will be considered.

Figure 10:
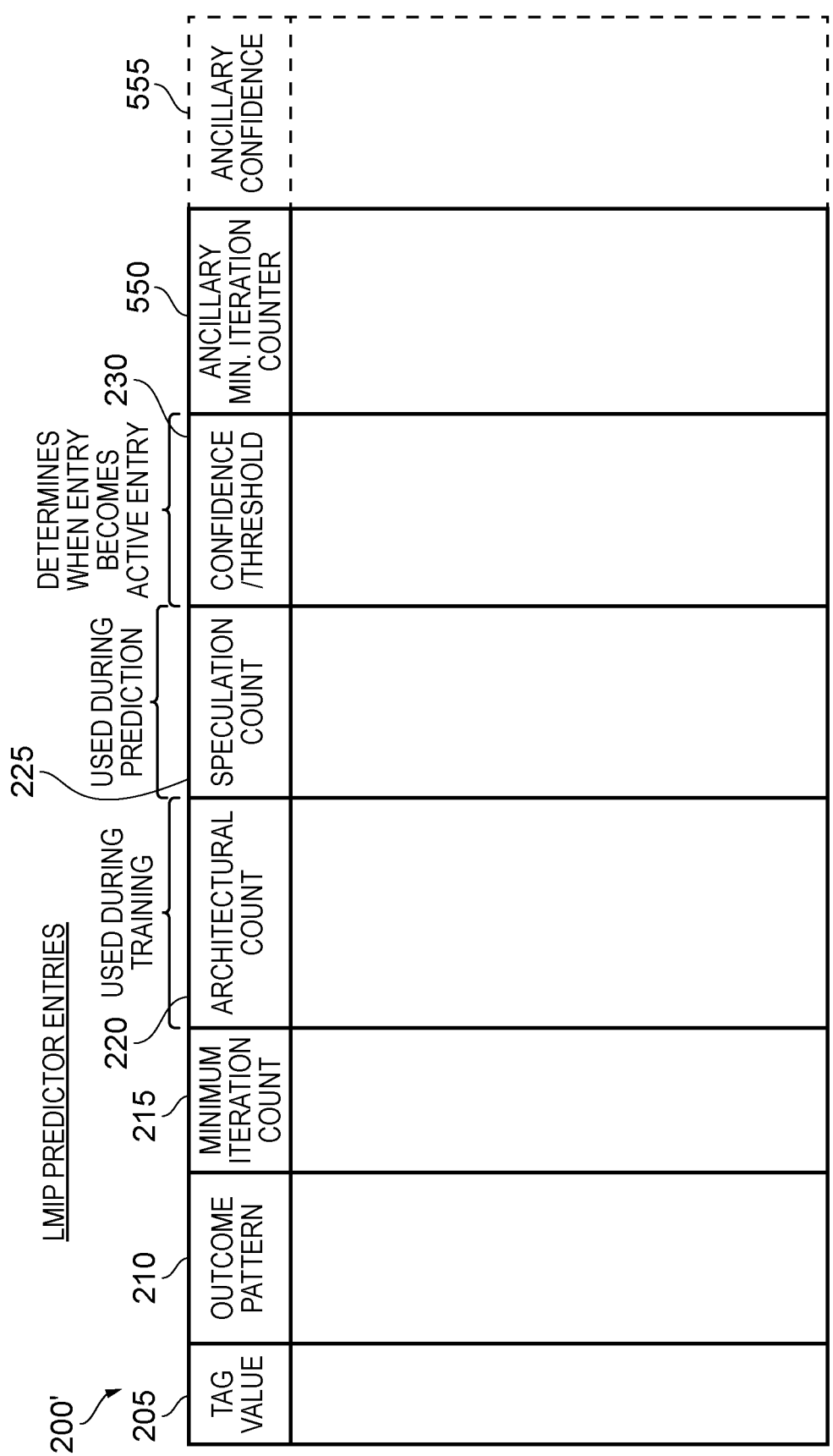
FIG. 10 illustrates the content of entries within the storage of the loop minimum iteration predictor in accordance with an alternative arrangement where an ancillary minimum iteration count is maintained.

In some instances an ancillary minimum iteration counter can be maintained, and optionally an associated ancillary confidence can be maintained for that ancillary minimum iteration counter. This results in the addition of one or two additional fields to each entry of the LMIP 120 predictor entries, as illustrated schematically in FIG. 10. In particular, FIG. 10 shows a storage 200', which is essentially the same as the storage 200 shown in FIG. 4, and indeed includes within each entry all of the fields discussed earlier with reference to FIG. 4. However, in addition an ancillary minimum iteration counter field 550 is provided for each entry. Further, in some implementations, an ancillary confidence indication field 555 may also be provided. How the ancillary counter and confidence information is used will be discussed later with reference to the examples of FIGS. 11B and 11C.

Figure 11A:
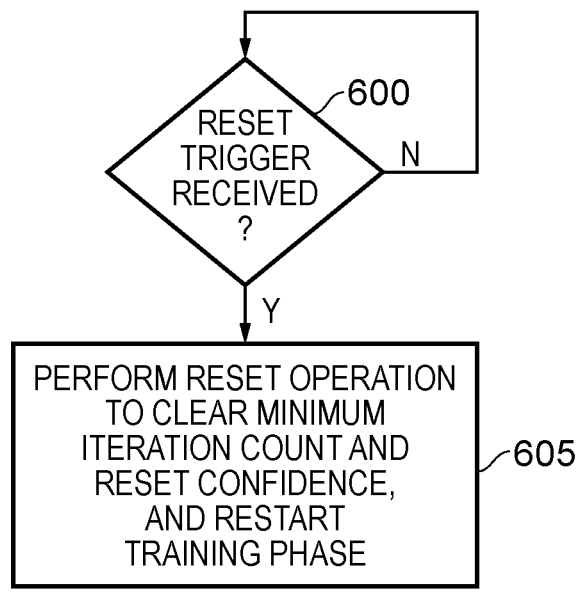
FIGS. 11A to 11C are flow diagrams illustrating various different ways in which the minimum iteration count may be reset in accordance with different example implementations.

However, first, an example will be discussed with reference to FIG. 11A, where no ancillary counter or confidence indication is kept. Instead, when a reset trigger is received at step 600, the process proceeds to step 605, where a reset operation is performed to clear the minimum iteration count in the field 215 and to reset the confidence, whereafter the training phase is restarted. This merely causes the entire training phase to be repeated from that point, and only once the confidence has reached a threshold will the LMIP 120 be able to continue making predictions in respect of the loop controlling branch instruction associated with that entry. The reset trigger can take a variety of forms, and could for example be activated periodically, or indeed randomly. The aim is to ensure that the minimum iteration count information does not become stale, and that it is a reasonable minimum iteration count taking into account the current program behaviour.

Figure 11B:
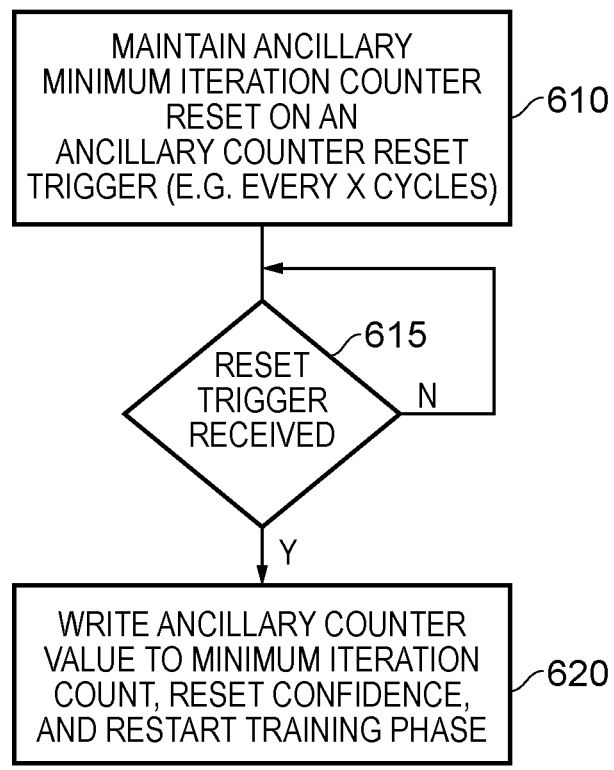

FIG. 11B illustrates an alternative approach where the ancillary minimum iteration counter 550 discussed earlier with reference to FIG. 10 is used. In particular, at step 610 an ancillary minimum iteration counter is reset on occurrence of an ancillary counter reset trigger. This could for example merely occur every time a certain number of clock cycles has elapsed, so as to cause a minimum iteration count to be tracked. The tracking of the ancillary minimum iteration count can be performed in exactly the same way as discussed earlier for the normal minimum iteration count during the training phase. Hence, the total number of iterations of the loop each time a loop is executed can be maintained in the architectural count field 220, and then once the loop is terminated, it can be determined whether the architectural count value is greater than or equal to the currently tracked ancillary minimum iteration count. If not, the ancillary minimum iteration count can be updated. In one implementation, there is no ancillary confidence, and hence the ancillary minimum iteration counter is merely updated so as to keep track of the minimum iteration count that has arisen during the observation period.

At step 615, a reset trigger is awaited. Again, the reset trigger could be a periodic trigger, or a randomly generated trigger. In addition, it could occur in response to an observation that an average total number of iterations has increased by a certain threshold amount since the training phase was completed. This could for example be detected by comparing the currently tracked ancillary minimum iteration count value 550 with the minimum iteration count value in the field 215.

In response to the reset trigger event, the process proceeds to step 620 where the ancillary counter value is written into the minimum iteration count field 215, the confidence is reset, and the training phase is restarted.

Hence, in the example of FIG. 11B, there is no ancillary training phase implemented in respect of the ancillary minimum iteration count, and instead the ancillary minimum iteration count is merely maintained for a period of time, and then written into the minimum iteration count field 215 on occurrence of the reset trigger. Thereafter, the normal training phase is performed in order to determine whether a suitable level of confidence can be established in respect of the minimum iteration count.

Figure 11C:
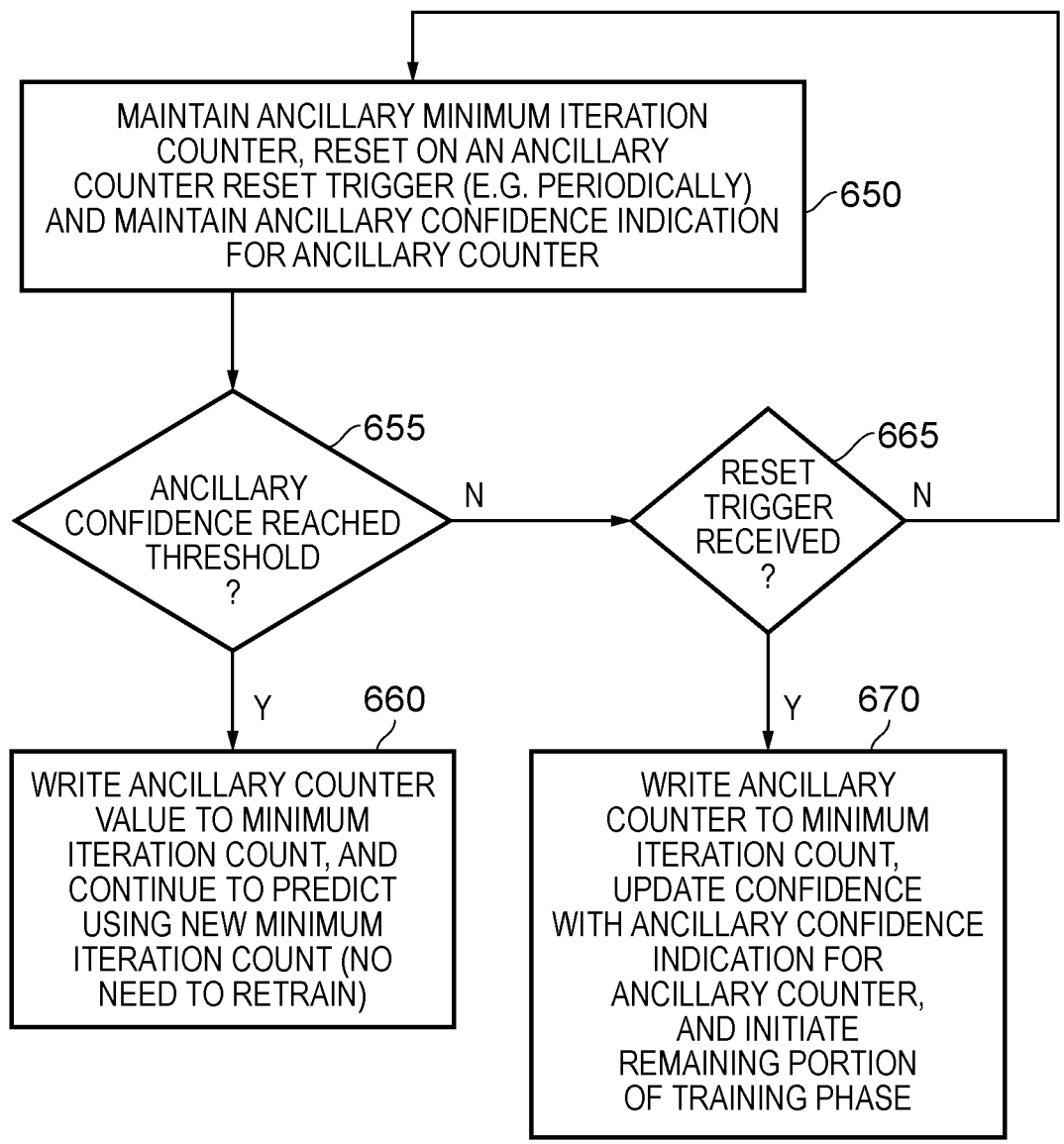

FIG. 11C illustrates a yet further alternative where an ancillary confidence is maintained within the field 555 in association with the ancillary minimum iteration count value in the field 550. Hence, at step 650, an ancillary minimum iteration counter is maintained which is reset on occurrence of an ancillary counter reset trigger (for example periodically), and whilst the ancillary minimum iteration count value is being maintained, an ancillary confidence indication is also maintained for the ancillary counter. In one example implementation, the same process as discussed earlier for the main minimum iteration count value can be performed at this point, by effectively performing steps 315 to 365 of FIG. 5 in respect of the ancillary minimum iteration count.

At step 655, it is determined whether the ancillary confidence has reached the threshold level, and if so this is effectively treated as a reset trigger and the process proceeds to step 660 where the ancillary counter value is written to the minimum iteration count field 215, and the LMIP 120 can then continue to predict using the new minimum iteration count. In particular, at this point there is no need to retrain, as the threshold level of confidence is deemed to have been detected in respect of the updated minimum iteration count value.

However, if the ancillary confidence has not reached a threshold, then it is determined whether the reset trigger has been received. If not, the process returns to step 650 to continue maintaining and monitoring the ancillary minimum iteration count. However, if at step 665 it is determined that the reset trigger has been received, then the process proceeds to step 670 where the ancillary counter value as currently held in the field 550 is written to the minimum iteration count field 215, and the confidence indication within the field 230 is updated with the ancillary confidence indication from the field 555. Thereafter, the remaining portion of the training phase is initiated. In this example, it will be appreciated that there may already be a reasonably high confidence in the minimum iteration count, but that it may not yet have quite reached the threshold level required to allow predictions to continue. However, rather than needing to reperform the training from scratch, benefit can be made of the confidence level reached at step 650, with only the remaining portion of the training phase needing to be performed.

From the above described illustrative examples, it will be appreciated that the LMIP 120 mechanism described herein enables improved prediction accuracy, by enabling a minimum iteration count to be reliably detected for a loop that does not have a stable number of total iterations. An entry can then be used to force the main direction of loop branches for the loop, with the output from the LMIP 120 taking precedence over the normal branch direction prediction mechanisms for a loop controlling branch instruction that has an active entry in the LMIP 120. As a result, even in situations where a loop controlling branch instruction is associated with a loop that does not have a stable total number of iterations, a highly reliable direction prediction can be made for a certain minimum number of iterations each time the loop is executed.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
processing circuitry to execute instructions; and
branch prediction circuitry to make branch outcome predictions in respect of branch instructions;
the branch prediction circuitry including loop minimum iteration prediction circuitry having one or more entries, each entry being associated with a loop controlling branch instruction that controls repeated execution of a loop comprising a number of instructions, wherein the loop minimum iteration prediction circuitry is arranged during a training phase to seek to identify a minimum number of iterations of the loop from an analysis of multiple instances of execution of the loop during the training phase, where a total number of iterations of the loop varies for the multiple instances of execution of the loop considered during the training phase;
the loop minimum iteration prediction circuitry being arranged, for a given instance of execution of the loop encountered after the training phase has successfully identified the minimum number of iterations, to identify a branch outcome prediction for the associated loop controlling branch instruction for use during each of the minimum number of iterations of the loop, with the branch prediction circuitry then employing another prediction component to make the branch outcome prediction for the associated loop controlling branch instruction for each remaining iteration of the given instance of execution of the loop.

2. An apparatus as claimed in claim 1, wherein the branch outcome prediction identified by the loop minimum iteration prediction circuitry indicates whether the associated loop controlling branch instruction is predicted as taken or predicted as not taken.

3. An apparatus as claimed in claim 1, wherein the loop minimum iteration prediction circuitry is triggered to maintain an entry for a loop controlling branch instruction for which a total number of iterations of the associated loop is unstable.

4. An apparatus as claimed in claim 1, wherein each entry is arranged to maintain a minimum iteration count value and a confidence indication, the confidence indication being updated during the training phase to indicate a confidence in the minimum iteration count value based on observation of a total number of iterations of the loop each time the loop is executed during the training phase.

5. An apparatus as claimed in claim 4, wherein:
each entry has a total iteration count field, during the training phase the loop minimum iteration prediction circuitry being arranged to monitor a current execution of the loop, and to maintain in the total iteration count field an indication of the total number of iterations of the loop that occur during the current execution of the loop; and
on completion of the current execution of the loop, the loop minimum iteration prediction circuitry is arranged, when the total number of iterations held in the total iteration count field is greater than or equal to the minimum iteration count value, to update the confidence indication to indicate an improved confidence in the minimum iteration count value.

6. An apparatus as claimed in claim 5, wherein:
on completion of the current execution of the loop, the loop minimum iteration prediction circuitry is arranged, when the total number of iterations held in the total iteration count field is less than the minimum iteration count value, to update the minimum iteration count value to equal the total number of iterations for the current execution of the loop, and to reset the confidence indication to an initial value.

7. An apparatus as claimed in claim 4, wherein:
when the confidence indication reaches a determined level, the loop minimum iteration prediction circuitry is arranged to determine that the training phase is complete; and
for a subsequent execution of the loop, the loop minimum iteration prediction circuitry is arranged to identify a branch outcome prediction for the associated loop controlling branch instruction for use during each of the minimum number of iterations identified by the currently maintained minimum iteration count value.

8. An apparatus as claimed in claim 1, wherein:
the branch prediction circuitry further includes loop termination prediction circuitry having one or more entries, each entry being associated with a loop controlling branch instruction, and being arranged during a termination prediction training phase to seek to identify whether the associated loop has a stable total number of iterations;
the loop termination prediction circuitry being arranged, when the termination prediction training phase has successfully identified a stable total number of iterations, to subsequently identify a branch outcome prediction for the associated loop controlling branch instruction for use during each of the iterations of the associated loop.

9. An apparatus as claimed in claim 8, wherein the loop minimum iteration prediction circuitry is triggered to maintain an entry for a loop controlling branch instruction for which the loop termination prediction circuitry has been unable to identify a stable total number of iterations for the associated loop.

10. An apparatus as claimed in claim 9, further comprising a common storage structure used to provide the entries for both the loop termination prediction circuitry and the loop minimum iteration prediction circuitry, each entry in the common storage having a type field which is set to identify whether the entry is associated with the loop termination prediction circuitry or the loop minimum iteration prediction circuitry.

11. An apparatus as claimed in claim 10, wherein:
when an entry is initially allocated for a loop controlling branch instruction, the type field identifies that the entry is for the loop termination prediction circuitry; and
when the loop termination prediction circuitry has been unable to identify a stable total number of iterations for the associated loop, the type field for that entry is updated to identify that the entry is for the loop minimum iteration prediction circuitry, whereafter the loop minimum iteration prediction circuitry is arranged to initiate its training phase to seek to identify a minimum number of iterations of the loop.

12. An apparatus as claimed in claim 1, wherein subsequent to the training phase successfully identifying a minimum number of iterations of the loop, the loop minimum iteration prediction circuitry is responsive to a reset trigger to perform a reset operation for the identified minimum number of iterations.

13. An apparatus as claimed in claim 12, wherein following the reset trigger, the training phase is restarted in order to seek to re-determine a minimum number of iterations for the loop.

14. An apparatus as claimed in claim 12, further comprising:
an ancillary counter storage to maintain an indication of the minimum number of iterations observed for the loop during a timing window prior to the reset trigger;
wherein in response to the reset trigger, the minimum number of iterations identified in the entry for the loop controlling branch instruction is updated to be a current value stored in the ancillary counter storage and the training phase is restarted.

15. An apparatus as claimed in claim 12, further comprising:
an ancillary counter storage to maintain an indication of the minimum number of iterations observed for the loop during an ancillary training phase prior to the reset trigger;
wherein in response to the reset trigger, the minimum number of iterations identified in the entry for the loop controlling branch instruction is updated to be a current value stored in the ancillary counter storage.

16. An apparatus as claimed in claim 15, wherein the reset trigger occurs once the ancillary training phase has successfully identified a minimum number of iterations.

17. An apparatus as claimed in claim 12, wherein the reset trigger is arranged to occur at least one of:
periodically;
randomly;
in response to an indication that an average total number of iterations has increased by a certain threshold amount since the training phase was completed; and
following completion of an ancillary training phase to seek to produce a further indication of a minimum number of iterations.

18. A method of performing branch prediction in an apparatus having processing circuitry to execute instructions, and branch prediction circuitry to make branch outcome predictions in respect of branch instructions, the method comprising:
using within the branch prediction circuitry loop minimum iteration prediction circuitry having one or more entries, each entry being associated with a loop controlling branch instruction that controls repeated execution of a loop comprising a number of instructions;
during a training phase for an entry, seeking to identify a minimum number of iterations of the associated loop from an analysis of multiple instances of execution of the loop during the training phase, where a total number of iterations of the loop varies for the multiple instances of execution of the loop considered during the training phase; and
for a given instance of execution of the loop encountered after the training phase has successfully identified the minimum number of iterations, employing the loop minimum iteration prediction circuitry to identify a branch outcome prediction for the associated loop controlling branch instruction for use during each of the minimum number of iterations of the loop, with the branch prediction circuitry then employing another prediction component to make the branch outcome prediction for the associated loop controlling branch instruction for each remaining iteration of the given instance of execution of the loop.

* * * * *